L. BÉCHEREAU.
MULTIPLE ENGINE DRIVING MECHANISM.
APPLICATION FILED NOV. 27, 1917.

1,309,451.

Patented July 8, 1919.
2 SHEETS—SHEET 2.

Witnesses:
Norris L. Sumby.

Inventor
Louis Béchereau
by
Attorney

THE COLUMBIA PLANOGRAPH CO., WASHINGTON, D. C.

UNITED STATES PATENT OFFICE.

LOUIS BÉCHEREAU, OF PARIS, FRANCE.

MULTIPLE-ENGINE DRIVING MECHANISM.

1,309,451.　　　　Specification of Letters Patent.　　Patented July 8, 1919.

Application filed November 27, 1917.　Serial No. 204,300.

*To all whom it may concern:*

Be it known that I, LOUIS BÉCHEREAU, engineer, citizen of the French Republic, residing at Paris, France, have invented certain new and useful Improvements in Multiple-Engine Driving Mechanism, of which the following is a specification.

The invention relates to multiple engine mechanism for driving an element, such as a propeller, by several coupled stationary engines.

The invention comprises means for driving an element, such as a propeller, by several coupled stationary engines, each comprising a driven shaft connected by a suitable gear to the crank shaft of the said engines, in which the element to be driven (propeller) is secured to the driven shaft of the first engine, the various engines being arranged behind each other so that their driven shafts are in line with each other, and are connected by a suitable member.

The invention will be in any case clearly understood from the following description, as well as from the accompanying drawing which is given merely by way of example.

Figure 1 of the said drawing shows in axial longitudinal section a group of two explosion engines driving a propeller and coupled together by means according to the invention.

Fig. 3 is an enlarged longitudinal vertical section showing the connecting shaft and two drive shafts associated therewith.

Figure 1:
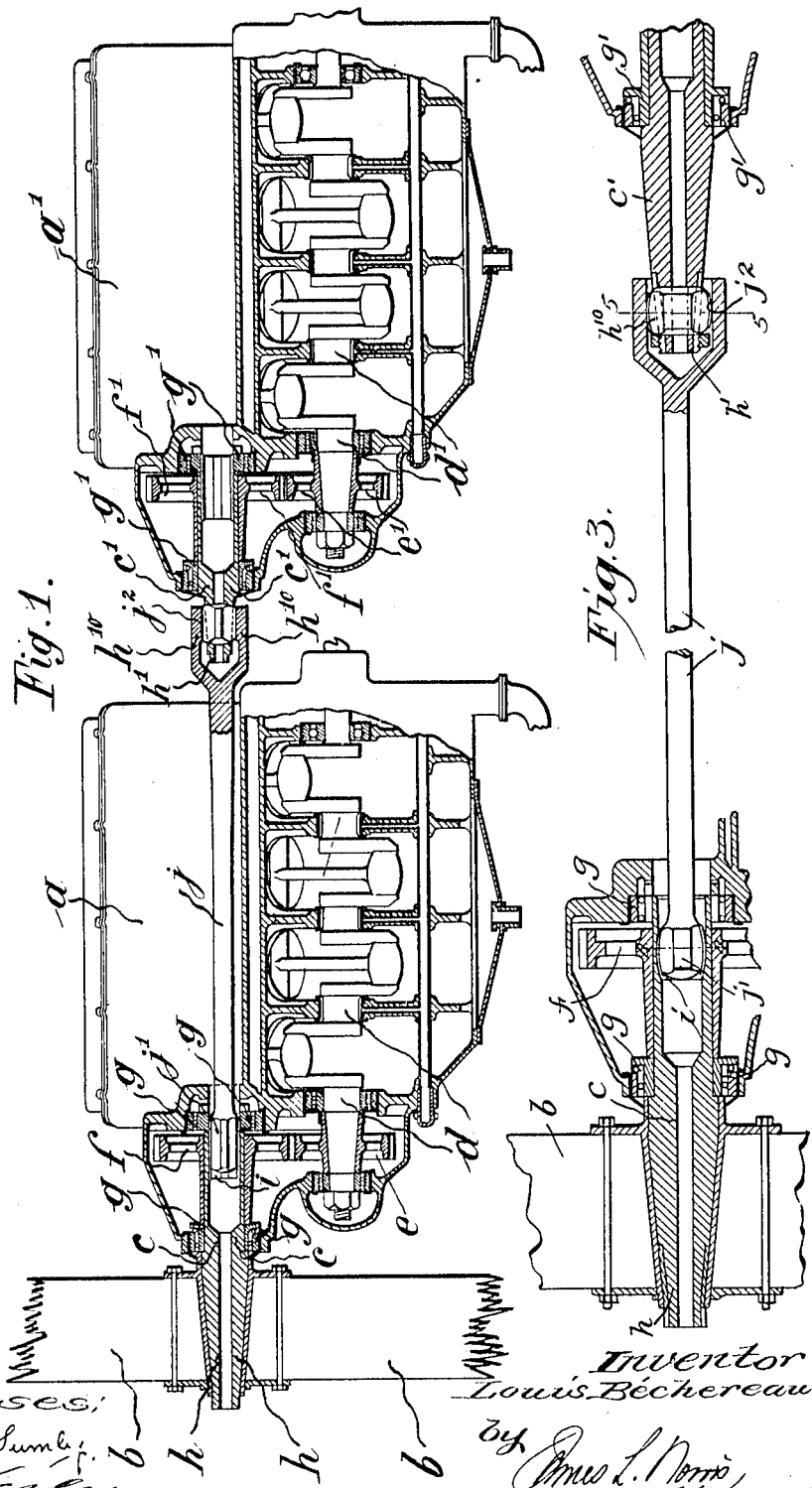
Figure 2:
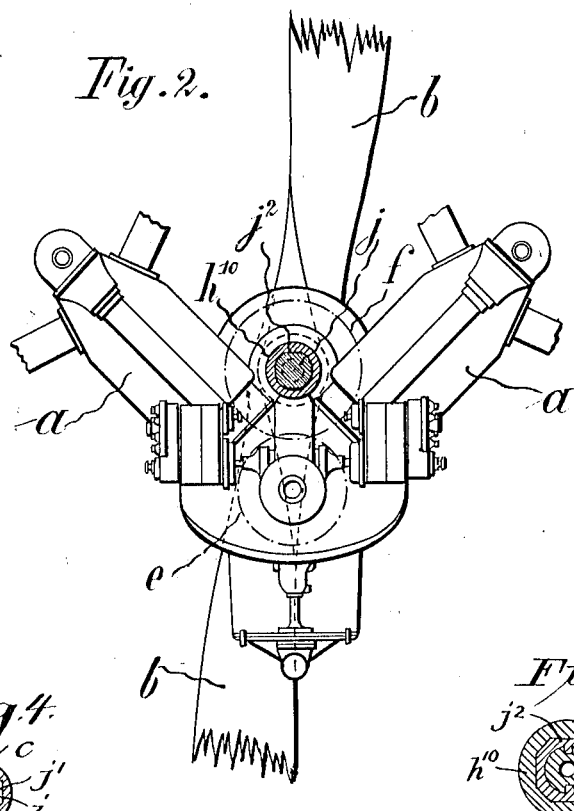
Fig. 2 shows one of the engines in end elevation.
Figure 4:
Fig. 4 is a cross-section on the line 4—4, Fig. 3, through the universal driving connection between the connecting shaft and one of the drive shafts associated therewith.
Figure 5:
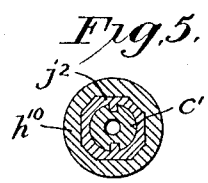
Fig. 5 is a cross-section on the line 5—5, Fig. 3.

The foremost engine $a$ adapted to drive a propeller $b$ comprises an intermediate or secondary shaft $c$ arranged parallel to the crank shaft $d$ and in its plane, the said intermediate shaft $c$ which is mounted on ball bearings $g$ arranged in suitable brackets secured to the casing of the engine, receiving its rotation from the crank shaft $d$ through a pair of pinions $e$ and $f$ of diameters suitably chosen so that the intermediate shaft $c$ can rotate at any speed relatively to the crank shaft $d$.

The outer end of the intermediate shaft $c$ is coned at $h$ to receive the propeller $b$, and at its other end has an inner axial bearing $i$, which is a cylindrical bearing with four flattened portions along four equidistant generatrices.

Another engine $a^1$ identical with the engine $a$, comprises an intermediate shaft $c^1$ arranged similarly to the intermediate shaft $c$ and receiving its motion from the crank shaft $d^1$ through a pair of pinions $e^1$ $f^1$ similar to the pair of pinions $e$ $f$.

The engine $a^1$ is fixed on the aeroplane so that it is immediately behind the engine $a$ and as close to the latter as possible and so that the axes of the two intermediate shafts $c$ and $c^1$ are in longitudinal alinement. The conical end $h^1$ of its intermediate shaft $c^1$ is arranged opposite the inner bearing $i$ of the shaft $c$.

The two intermediate shafts $c$ and $c^1$ are then connected together, after having fixed on the conical bearing $h^1$ a sleeve $h^{10}$ having an outer bearing of the same cross-section as the inner axial bearing $i$, by means of a shaft $j$ with an outer bearing $j^1$, and an inner bearing $j^2$ adapted to fit respectively the bearing $i$ of the shaft $c$, and the sleeve $h^{10}$ of the shaft $c^1$.

Two coupled stationary explosion engines thus drive together a propeller, their coupling being very simple and very reliable. They can be coupled together quickly, and at the same time uncoupled quickly, so that the propeller can be driven by either of them. Owing to the intermediate shafts of two adjoining engines being coupled to each other by means of a shaft with bearings of the kind described, slight deviations in the alinement of the shafts do not matter, these deviations being caused by the action of expansion, vibration and deformation of the fuselage.

Obviously the invention is not limited to the construction described, but comprises any modifications within the scope of the claims, that is to say, forming the connecting part between two consecutive intermediate shafts as a Cardan shaft or a shaft having at its respective ends claw bearings, or a shaft with disks or the like.

Having now particularly described and ascertained the nature of my said invention and in what manner the same is to be performed, I declare that what I claim is:—

1. Mechanism of the class described comprising multiple stationary engines, each engine having a crank shaft, a driven shaft geared to the crank shaft of each engine, a connecting shaft interposed between the driven shafts, the connecting shaft and driven shafts having engaging terminal coupling joint means, and a driven device on the front extremity of the driven shaft of the foremost engine, the driven shafts and the connecting shaft being in longitudinal alinement.

2. Mechanism of the class described consisting of independent engines of similar structure arranged in tandem and each comprising a crank shaft, a driven shaft at a distance from each crank shaft and geared to the latter and whereby the power of the independent crank shafts is uniformly transmitted to the driven shafts, a connecting shaft in longitudinal alinement with and terminally joined to the rear end of the foremost driven shaft at the front end of the driven shaft in rear of the said foremost shaft, joints being provided in part as portions of the opposite ends of the connecting shaft and in part as portions of the rear end and front end respectively of the foremost and rear driven shafts, and a driven device carried by one of the driven shafts and whereby the driving power of a number of engines may be concentrated to operate a single driven device.

In testimony whereof I have hereunto set my hand in presence of a subscribing witness.

LOUIS BÉCHEREAU.

Witness:
TESJEN JULLIES.

Copies of this patent may be obtained for five cents each, by addressing the "Commissioner of Patents, Washington, D. C."